United States Patent [19]

Maeda

[11] Patent Number: 4,503,557
[45] Date of Patent: Mar. 5, 1985

[54] PATTERN RECOGNITION APPARATUS AND METHOD

[75] Inventor: Kenichi Maeda, Yokohama, Japan

[73] Assignee: Tokyo Shibaura Denki Kabushiki Kaisha, Kawasaki, Japan

[21] Appl. No.: 366,667

[22] Filed: Apr. 8, 1982

[30] Foreign Application Priority Data

Apr. 27, 1981 [JP] Japan .................. 56-63844

[51] Int. Cl.³ .............................. G06K 9/64
[52] U.S. Cl. .......................... 382/34; 382/36
[58] Field of Search .................... 382/27, 33–34, 382/36–39; 381/42–43

[56] References Cited

U.S. PATENT DOCUMENTS

| 3,541,511 | 11/1970 | Genchi et al. | 382/25 |
| 3,688,267 | 8/1972 | Iijima et al. | 382/36 |
| 3,906,446 | 9/1975 | Iijima et al. | 382/36 |
| 4,059,725 | 11/1977 | Sakoe | 381/43 |
| 4,286,115 | 8/1981 | Sakoe | 381/43 |
| 4,319,221 | 3/1982 | Sakoe | 382/36 |
| 4,386,432 | 5/1983 | Nakamura et al. | 382/36 |

FOREIGN PATENT DOCUMENTS 55-28155 2/1980 Japan.

OTHER PUBLICATIONS

Japan Electrocommunication Society, *National Convention*, pp. 5-343, (1980).
Genchi et al., "Recognition of Handwritten Numerical Characters for Automatic Letter Sorting", 56 *Proceedings of the I.E.E.E.*, 1292, 8/1968.

*Primary Examiner*—Leo H. Boudreau
*Attorney, Agent, or Firm*—Banner, Birch, McKie & Beckett

[57] ABSTRACT

The invention is directed to a pattern recognition apparatus and method by which an unknown input pattern is divided into a plurality of sub-area patterns which are matched with a plurality of standard partial characteristic patterns to form an input pattern similarity matrix F. The input pattern similarity matrix is then matched with a plurality of reference similarity matrices Φl of standard reference patterns, whereby the unknown pattern is recognized as the one of the L standard reference patterns which gives the best matching.

23 Claims, 18 Drawing Figures

F I G. 1
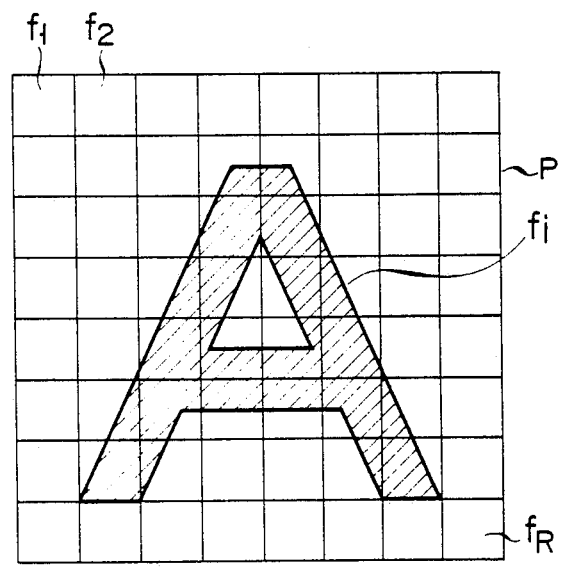
F I G. 2
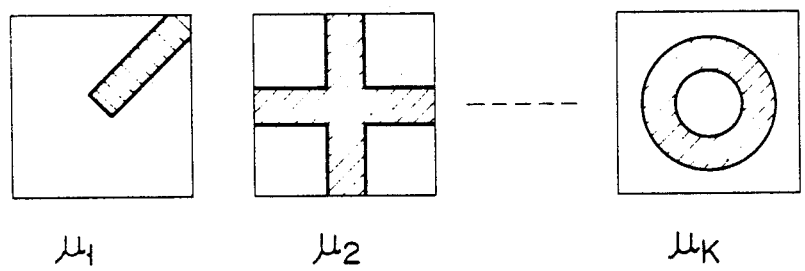

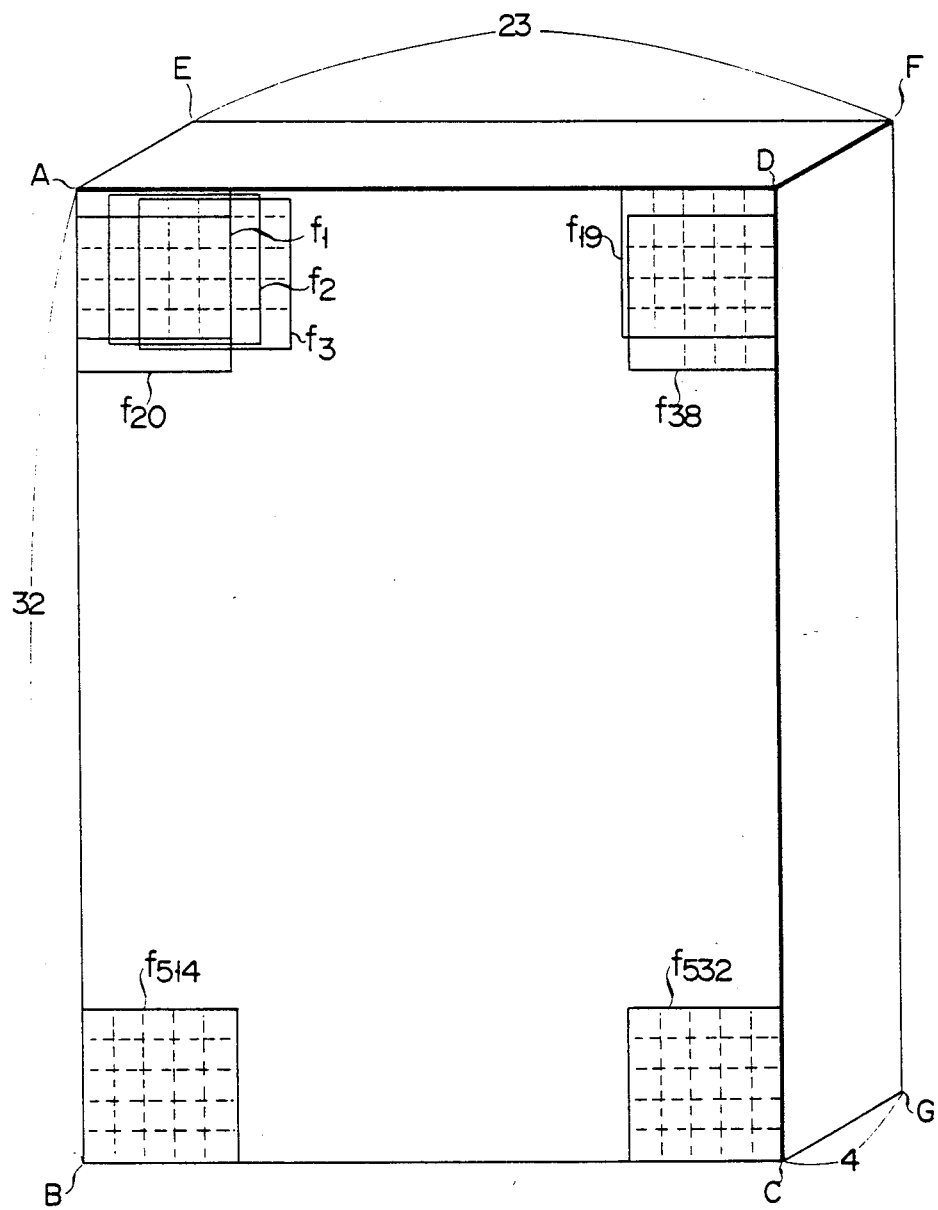

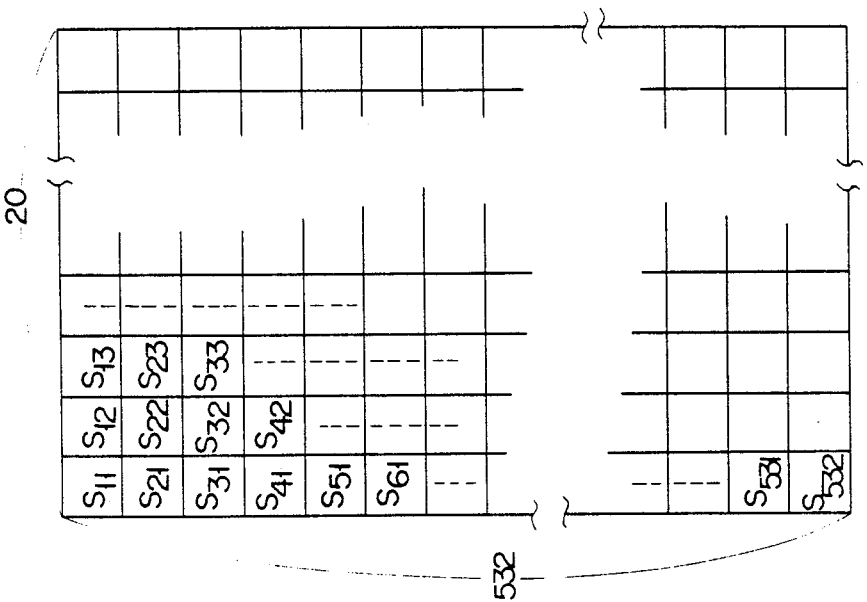

F I G. 14
F I G. 13
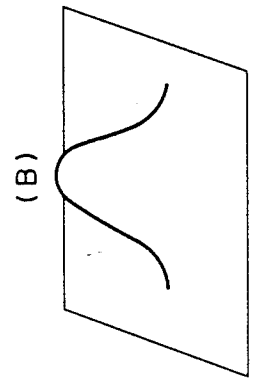
F I G. 12

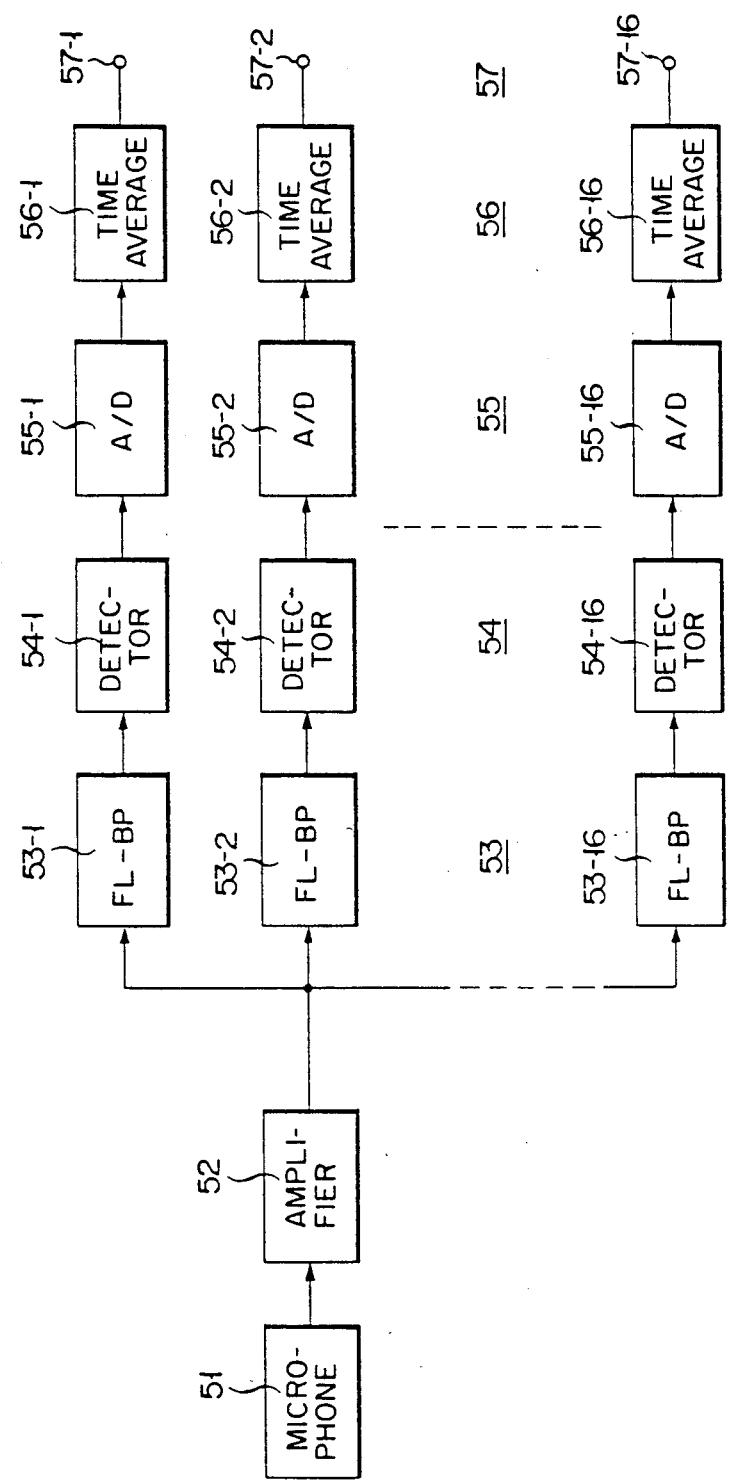
F I G. 15

F I G. 16
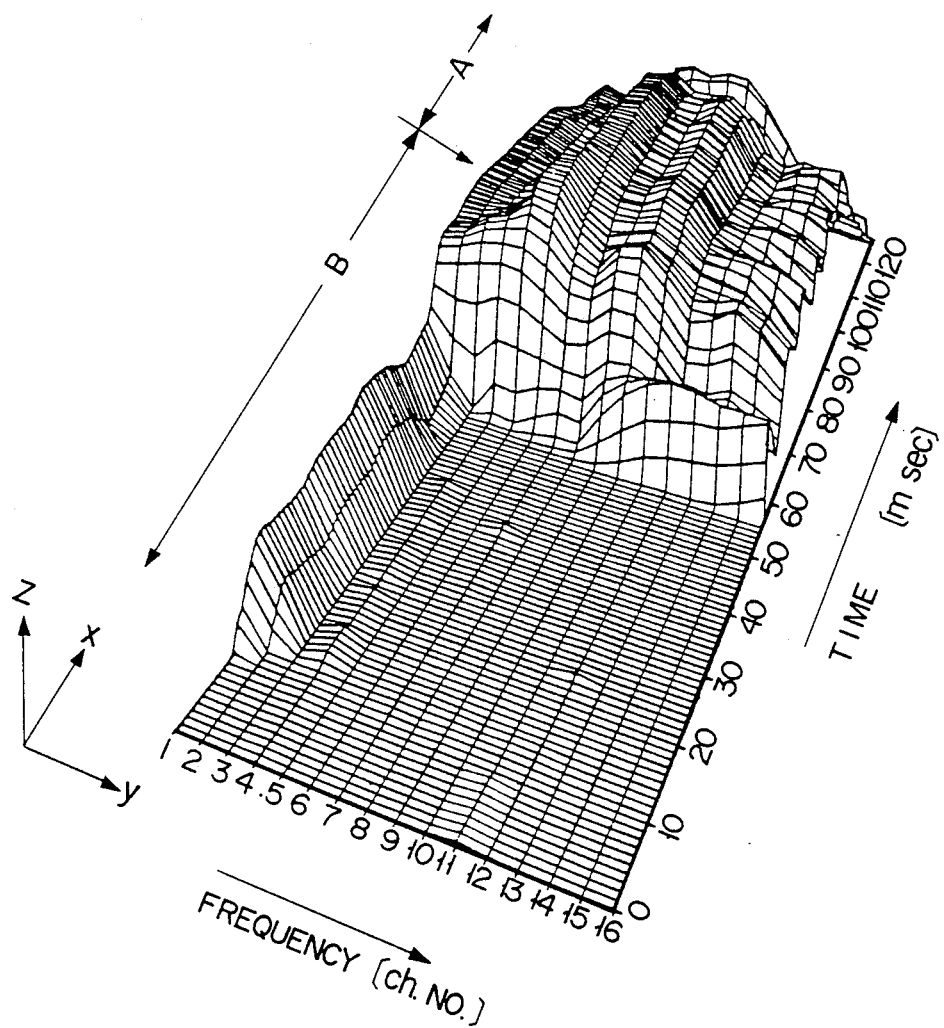

PATTERN RECOGNITION APPARATUS AND METHOD

BACKGROUND OF THE INVENTION

This invention relates to an apparatus and method for recognizing various kinds of patterns including characteristic patterns, and particularly to an apparatus and method which allow accurate recognition of input patterns which are subject to overall changes.

Pattern recognition apparatus have recently begun to be practically used as inputs to computer systems. The conventional pattern recognition methods are classified as a pattern matching method and a character extraction method. The similarity method, one of the pattern matching methods, has been widely utilized. In this method, the simple similarity S is expressed by the following equation, $$S = \frac{(f, f_o)^2}{\|f\|^2 \|f_o\|^2} = S[f, f_o] \quad (1)$$

where f is an n-dimensional vector indicating an unknown black and white pattern on a plane;

$f_o$ is an n-dimensional vector indicating a standard reference pattern to which the pattern f is referred;

$(f, f_o)$ is the scalar (dot) product of the vectors f and $f_o$; and $\|f\|$ and $\|f_o\|$ are norms (magnitudes) of the vectors f and $f_o$, respectively.

More specifically, any pattern drawn on a plane can be expressed by an n-dimensional vector in the following manner: The plane is divided into n picture elements or cells, each of which has a darkness or density which is a function of its position on the plane. If the positions of the picture elements are expressed as $x_1, x_2, \ldots, x_n$ and the darkness of the picture elements are expressed as $f(x_1), f(x_2), \ldots, f(x_n)$, respectively, the vector f can be uniquely defined in n-dimensional coordinates where $f(x_1), f(x_2), \ldots, f(x_n)$ correspond to the projections of the vector f on the coordinate axes $1, 2, \ldots, n$.

The simple similarity defined by equation (1) means that S takes maximum value 1 when two vectors f and $f_o$ in n-dimensional coordinates are parallel and that S takes minimum value 0 when the two vectors are perpendicular. Thus S varies from the value 1 where two patterns on the plane are overlapped to the value 0 where the two patterns are quite different from each other.

This simple similarity method has a great advantage that the design of a dictionary of standard reference patterns can be automated, and that it is not greatly affected by such local noise as stains or scratches in the patterns. It is liable to be affected adversely, however, by such overall changes in the patterns as occur in handwritten letters or voice sound patterns.

One conventional method that has been developed and used to overcome these drawbacks is the multiple similarity method shown, for example, in U.S. Pat. No. 3,688,267. According to this method, a number of secondary reference patterns are provided, for each one of the primary reference patterns, each of which corresponds to a deformation of the primary reference pattern. Multiple similarity $S^*$ is expressed as follows:

$$S^* = \sum_{m=1}^{M} S[f, \phi_m] = S^*[f, \phi_m] \quad (2)$$

where $\phi_m$ (m = 1, 2, ... M) are the primary and secondary reference patterns. This value of $S^*$ also varies from 0 to 1 in accordance with the similarity between the pattern f and the set of reference patterns $\phi_m$. While this multiple similarity method is useful for the recognition of patterns which are subject to overall deformations, there still existed the problem that much labor for gathering sample data, and highly complicated computation, were needed in the design of the dictionary.

One example of the conventional character extraction method is shown in U.S. Pat. No. 4,541,511. In this method, various kinds of characters are extracted from various parts of the patterns, and the reference patterns and unknown patterns are recognized by a combination of these reference characteristic patterns. The problem in this method, however, has been that complicated algorithmic processing is required. There is also the difficulty that the method cannot be easily automated and much labor is needed to operate it.

It has also been proposed that the multiple similarity method and the character extraction method be combined for more accurate recognition of handwritten letters. This method is disclosed, for example, in the preliminary report for the National Convention of the Electrocommunication Society, page 5-378, published by the Japan Electrocommunication Society. According to this method, the multiple similarity method is applied to the unknown patterns in the first stage, and in the second stage the character extraction method is applied to the result from the first stage. This combined method is useful for the recognition of complicated handwritten letters such as Japanese letters. The apparatus for realizing the method is, however, complicated; and automatic design of the dictionary is also difficult.

SUMMARY OF THE INVENTION

It is therefore an important object of the invention to provide a new and improved pattern recognition apparatus and method.

It is a further object of the invention to provide a new and improved pattern recognition apparatus and method which are capable of recognizing, with high accuracy, patterns which are liable to be subject to overall changes.

It is a more specific object of the invention to provide a new and improved pattern recognition apparatus and method which are more suitable for automatic designing of the dictionary, i.e., means for storing a great number of reference patterns with which unknown patterns are compared.

According to the invention, unknown input patterns to be recognized are converted into electrical signals representing the darkness of the picture elements forming the input patterns. The electrical signals thus converted are stored in a first buffer memory. The electrical signals corresponding to each sub-area of the input patterns are read out one by one from the first buffer memory by a first read out device. A first dictionary memory is provided for storing electrical signals representing a plurality of partial characteristic patterns. Such electrical signals represent the darkness or densities of the picture elements forming the partial characteristic patterns. The electrical signals corresponding to each of the partial characteristic patterns are read out one by one from the first dictionary memory by a second readout device. The signals representing the sub-area patterns and the partial characteristic patterns are provided to a first similarity calculator. The first similarity calculator calculates the similarities between each one of the sub-areas of the input pattern and each one of the partial characteristic patterns. The results of the calculation are stored in a second buffer memory in the form of an input pattern similarity matrix F. The elements of the matrix F are similarities between the plurality of sub-area patterns of the input pattern and the plurality of partial characteristic patterns. A second dictionary memory is provided for storing a plurality of reference similarity matrices $\Phi^l$ ($l=1, 2, \ldots L$) for a plurality (i.e., L) of different reference characters. Each reference similarity matrix $\Phi^l$ has a plurality of elements which are the similarities between the sub-areas of reference patterns to which the input patterns are referred for recognition and the partial characteristic patterns. The input pattern similarity matrix F is read out from the second buffer memory by a third readout device. The reference similarity matrices $\Phi^l$ are read out one by one from the second dictionary memory by a fourth read out device. These matrices F and $\Phi^l$ are then supplied to a second similarity calculator for calculating the similarities between them. The results of this calculation are supplied to a comparator which decides which pattern is being recognized; thus it is possible to satisfy the objectives mentioned above. Other objects and features of this invention will be apparent from the following description read in connection with the accompanying drawings.

BRIEF DESCRIPTION OF THE DRAWINGS

FIG. 1 is an example of an unknown input pattern for explaining the principle of the invention;

FIG. 2 shows several partial characteristic patterns as examples for explaining the principle of the invention;

FIG. 7 is a schematic view of a virtual memory plane storing the input pattern (not shown) for explaining how the sub-areas of the input pattern are read out;

FIG. 8 shows a sub-area pattern and a partial characteristic pattern for explaining an operation carried out in the first similarity calculator of FIG. 5;

FIG. 9 is a schematic diagram showing a virtual memory plane of the second buffer memory of FIG. 5;

FIG. 12 shows a virtual memory plane in the second buffer memory for explaining the operation of the apparatus shown in FIG. 11;

FIG. 13 is a schematic diagram showing a mask pattern stored in the mask pattern memory of FIG. 11;

FIG. 14 shows a virtual memory plane of a third buffer memory shown in FIG. 11;

FIG. 15 is a block diagram showing a preprocessing device for converting voice signals into pattern signals which can then be applied to the pattern recognition apparatus according to the present invention;

FIGS. 16 and 17 are schematic diagrams showing a human voice pattern obtained by the device shown in FIG. 15;

FIG. 18 shows examples of partial characteristic patterns that can be used for recognition of sound patterns using this invention.

DETAILED DESCRIPTION OF THE PREFERRED EMBODIMENT

Figure 3:
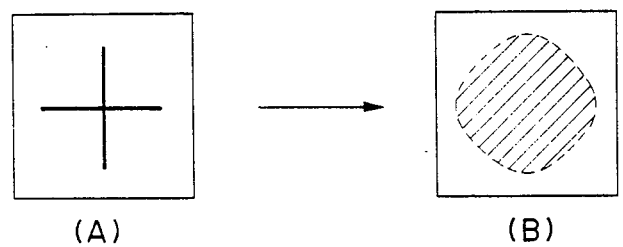
FIGS. 3 and 4 show blurred patterns for explaining the principle of the invention.

The following theoretical explanation is given with reference to FIGS. 1–4 in order to explain the features of the present invention. Shown in FIG. 1 is an example of an unknown input pattern, a character "A" drawn on the plane P. The plane P is divided into a plurality of (e.g., R) sub-areas which are represented by vectors $f_1$, $f_2, \ldots, f_R$, respectively. On the other hand, a plurality of (e.g., K) partial characteristic patterns represented by vectors $u_1, u_2, \ldots, u_K$, respectively are stored in a first dictionary memory, some of them being shown in FIG. 2. The similarities between each of R sub-area patterns and each of K partial characteristic patterns are calculated in accordance with the equation (1). The results are shown in the following Table 1.

TABLE 1

| f | $u_1$ | $u_2$ | — | $u_j$ | — | $u_K$ |
|---|---|---|---|---|---|---|
| $f_1$ | $S_{11}$ | $S_{12}$ | — | $S_{ij}$ | — | $S_{iK}$ |
| $f_2$ | $S_{21}$ | $S_{22}$ | — | $S_{2j}$ | — | $S_{2K}$ |
| $f_i$ | $S_{i1}$ | $S_{i2}$ | — | $S_{ij}$ | — | $S_{iK}$ |
| $f_R$ | $S_{R1}$ | $S_{R2}$ | — | $S_{Rj}$ | — | $S_{RK}$ |

$S_{ij}$ in Table 1 is the similarity of the ith sub-area pattern $f_i$ to the jth partial characteristic pattern $u_j$. The similarity $S_{ij}$ is expressed in the case of simple similarity as follows:

$$S_{ij} = \frac{(f_i \cdot u_j)^2}{\|f_i\|^2 \|u_j\|^2} \quad (3)$$

A set of similarities shown in Table 1 are expressed in the following matrix F having R rows and K columns.

$$F = \begin{pmatrix} S_{11} & S_{12} - S_{1K} \\ S_{21} & S_{22} - S_{2K} \\ \vdots & \vdots & \vdots \\ S_{R1} & S_{R2} - S_{RK} \end{pmatrix} \quad (4)$$

Or replacing the rows with the columns the following matrix is obtained:

$$F' = \begin{pmatrix} S_{11} & S_{21} - S_{R1} \\ S_{12} & S_{22} - S_{R2} \\ \vdots & \vdots & \vdots \\ S_{1K} & S_{2K} - S_{RK} \end{pmatrix} \quad (4')$$

The matrix F (or F') is prepared for every input pattern to be recognized.

A plurality of reference patterns to which input patterns are referred for recognition are converted into matrix forms $\Phi^l$ in the same manner as mentioned above. This matrix $\Phi^l$ is expressed as follows:

$$\Phi^l = \begin{pmatrix} \phi_{11}{}^l & \phi_{12}{}^l & -- & \phi_{1K}{}^l \\ \phi_{21}{}^l & \phi_{22}{}^l & -- & \phi_{2K}{}^l \\ \vdots & \vdots & & \vdots \\ \phi_{R1}{}^l & \phi_{R2}{}^l & -- & \phi_{RK}{}^l \end{pmatrix} \quad (5)$$

Or, $$\Phi^l = \begin{pmatrix} \phi_{11}{}^l & \phi_{21}{}^l & -- & \phi_{R1}{}^l \\ \phi_{12}{}^l & \phi_{22}{}^l & -- & \phi_{R2}{}^l \\ \vdots & \vdots & & \vdots \\ \phi_{1K}{}^l & \phi_{2K}{}^l & -- & \phi_{RK}{}^l \end{pmatrix} \quad (5')$$

The element $\phi_{ij}{}^l$ of the matrix $\Phi^l$ (or $\Phi^{l'}$) is the simple similarity of the ith sub-area pattern $f_{oi}$ to the jth partial characteristic pattern $u_j$, which is the same pattern used for forming the matrix F of the unknown input pattern f. The letter l of $\Phi^l$ means that $\Phi^l$ is the similarity matrix of the lth one of L reference patterns. In case of the recognition of alphabetic characters, for example, $\Phi^2$ indicates the similarity matrix of the letter "B" and L is equal to 26. L matrices $\Phi^l$ (l=1, 2, ..., L) thus produced are stored in a second dictionary memory in advance of the receipt of the unknown input patterns for recognition.

The similarity between the input pattern similarity matrix F and the reference similarity matrix $\Phi^l$ is then calculated by the following equation:

$$S = \frac{(F, \Phi^l)^2}{\|F\|^2 \|\Phi^l\|^2} \quad (6)$$

where $(F, \Phi^l)$ is the scalar product of F and $\Phi^l$ when they are regarded as vectors having as their elements the set of first similarities. $\|F\|$ and $\|\Phi^l\|$ are norms of the vectors F and $\Phi^l$. The result of the calculation carried out according to equation (6) takes a value between 0 and 1. After calculating the similarities between the matrix F and all of the matrices $\Phi^l$ (l=1, 2, ..., L), the input pattern is recognized as the reference pattern that gives the maximum value of similarity.

According to the invention mentioned above, the partial characteristics of the pattern are incorporated into the recognition of whole patterns so that accurate recognition is provided despite the overall changes in the input pattern. Further, the recognition apparatus is simplified because the pattern recognition method according to the present invention applies the same similarity method to both the sub-areas and the whole area of the input pattern. It is easy to automatically design the dictionaries for storing partial characteristic patterns and similarity matrices $\Phi^l$.

Figure 4:
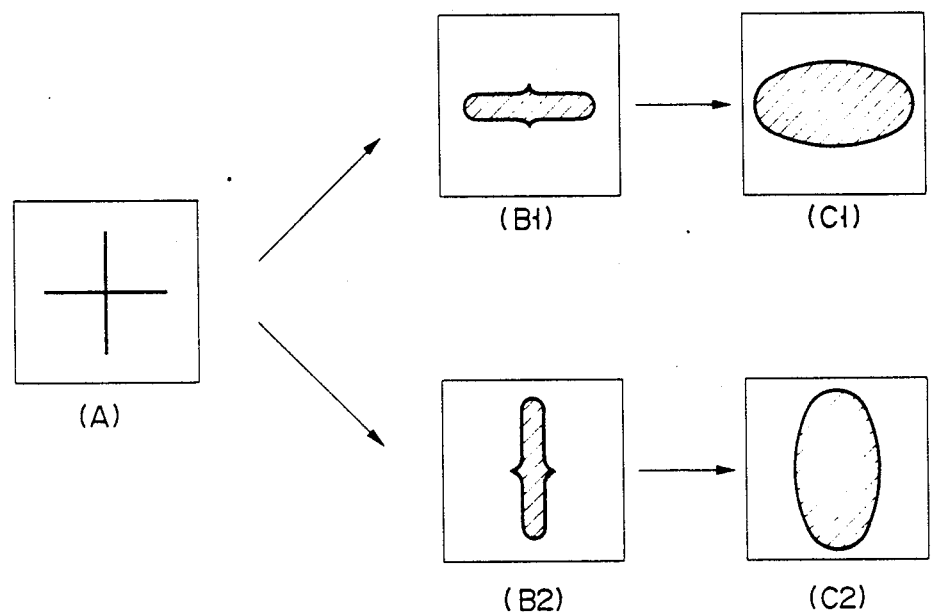

According to another embodiment of the invention, blurring is more effectively applied than in the conventional method of pattern recognition. As is well known, blurring has been applied directly to the input or reference paterns to eliminate the effects of such local noises as stains or scratches in the patterns. According to the invention, however, the blurring process is applied to either the matrix F of the input pattern or the matrix $\Phi^l$ of the reference patterns or both. Too much blurring in the conventional methods creates unrecognizable patterns as shown in FIG. 3 in which (A) is an original pattern and (B) is a blurred pattern. According to the invention, a large amount of blurring can be applied while still maintaining ability to recognize the original pattern as shown in FIG. 4. The partial characteristic patterns (B1) and (B2) are extracted from the original pattern (A) and are given a large amount of blurring, retaining the original characters as shown in (C1) and (C2) respectively. As is well known, the more blurring, the easier the recognition in the pattern matching method.

Figure 5:
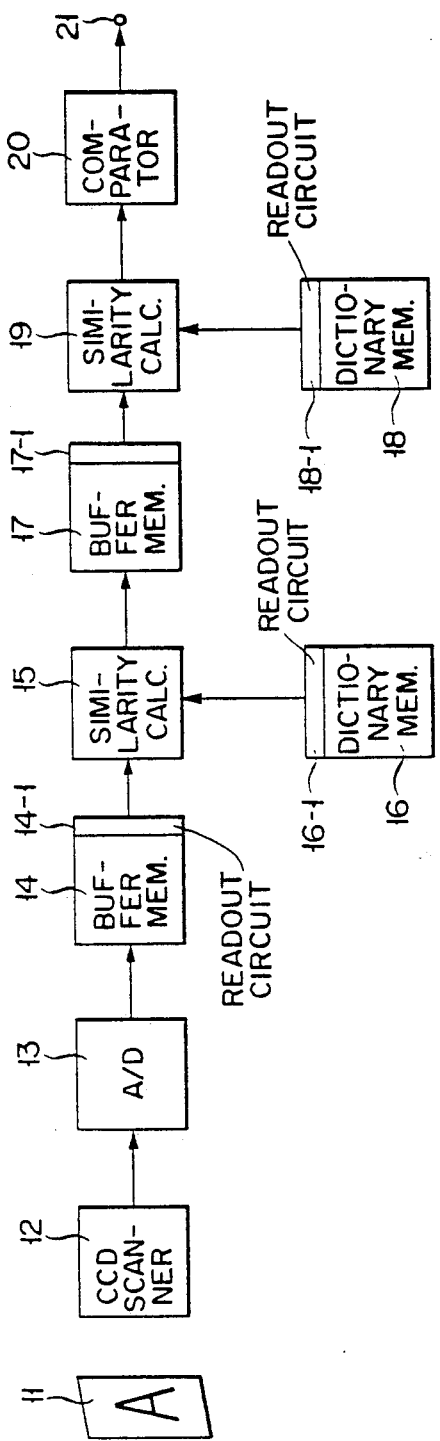
FIG. 5 is a block diagram of the pattern recognition apparatus which is an example of an embodiment of this invention.

FIG. 5 shows the preferred embodiment of the apparatus for pattern recognition according to the present invention. A characteristic pattern "A" drawn on the plane 11 is optically scanned by, for example, by a CCD (Charge Coupled Device) scanner 12 and converted into electrical signals. (An image pick up tube such as a flying spot scanner or vidicon camera can also be used). The output signals of the CCD scanner 12 are sampled, quantized and converted into digital signals in an A/D (Analog/Digital) converter 13. The A/D converter 13 provides at its output terminal digital signals of 4 digits, for example, representing the darkness or density of each of a number of picture elements on the plane 11.

The number of elements is, for example, 23×32 for each input pattern. The output signals of A/D converter 13 are stored in a first buffer memory 14. The contents of buffer memory 14 are read out by its readout circuit 14-1 such that the signals corresponding to every sub-area are read out one by one. The signals read out from each sub-area are supplied to a first similarity calculating circuit 15.

Figure 6:
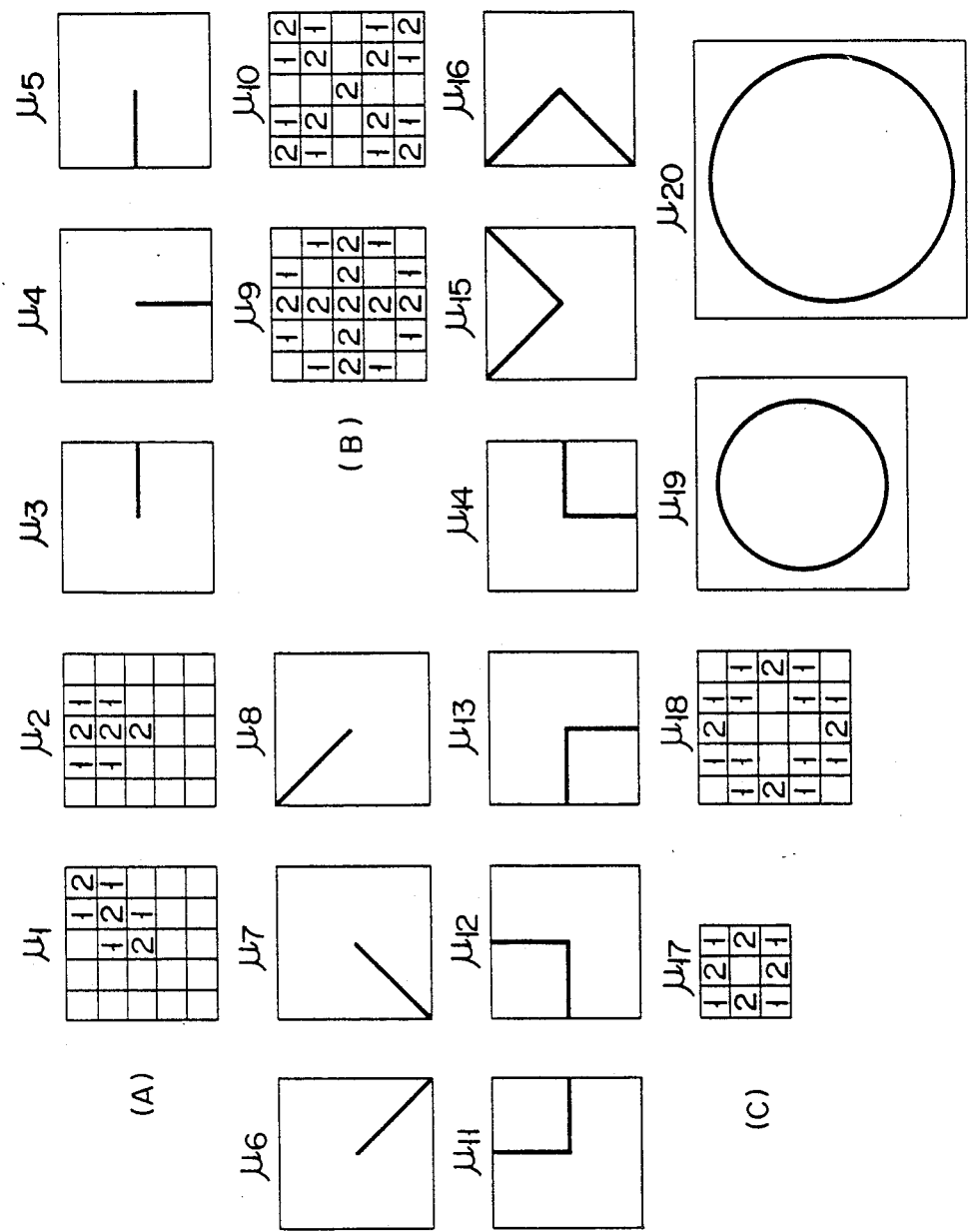
FIG. 6 shows examples of the partial characteristic patterns provided for the apparatus shown in FIG. 5.

A first dictionary memory 16 is provided for supplying partial characteristic patterns to the similarity calculating circuit 15. FIG. 6 shows some examples of partial characteristic patterns to be stored in the first dictionary memory 16. In FIG. 6(A), $u_1$–$u_8$ represent "endpoints" with 5×5 picture elements or cells each having a value of the darkness. The values 1, 2, ... represent increasing levels of darkness, and the elements with no figure correspond to the white level 0. It is clear from the patterns $u_1$–$u_8$ that "endpoint" means a line in a certain direction having its end portion at the center part of the field of 5×5 cells. For simplification, $u_3$–$u_8$ are represented by straight lines in the different directions. Patterns $u_9$–$u_{16}$ in FIG. 6(B) represent "intersection points" which means that two lines are crossing at the center portion of the field of 5×5 cells. Patterns $u_{11}$–$u_{16}$ are slightly different from $u_9$ and $u_{10}$ in that the two lines crossing at the center portion end at the cross point. These patterns $u_{11}$–$u_{16}$ are also represented by straight lines for simplification. Partial Characteristic patterns $u_{17}$–$u_{20}$ in FIG. 6(C) represent "loops" having different diameters. Patterns $u_{19}$ and $u_{20}$ are also described as circles for simplification. In this case, the sizes of the fields differ from each other such that $u_{17}$ has 3×3 cells, $u_{18}$ has 5×5 cells and so on. These partial characteristic patterns $u_1$–$u_{20}$ are read out one by one by the read out circuit 16-1 of the first dictionary memory 16 and supplied to the first similarity calculating circuit 15.

FIG. 7 shows the read out process where sub-areas of the input pattern are read out in order from the first buffer memory 14 by its read out circuit 14-1. A box-like pattern A-B-C-D-E-F-G represents stacked virtual memory planes with 23×32×4 cells stored in the first buffer memory 14. The 23×32 cells correspond to the number of picture elements of the input pattern. Four bits are used to store the darkness of each picture element. The signals corresponding to the first sub-area pattern $f_1$ of the input pattern having 5×5 cells are read out from the uppermost and the leftmost part of the memory plane. The signals corresponding to the pattern $f_1$ are supplied to the first similarity calculating circuit 15 of FIG. 5. At the same time, the signals corresponding to the partial characteristic pattern $u_1$ are read out from the first dictionary memory 16 and supplied to the first similarity calculating circuit 15 by its read out circuit 16-1.

The first similarity calculating circuit calculates the similarity between the first sub-area pattern $f_1$ and the first partial characteristic pattern $u_1$ following the equation (3). More specifically, the pattern $f_1$ and $u_1$ are shown in FIG. 8 and the elements of each pattern are expressed by their darkness $f_1(x_1), f_1(x_2), \ldots, f_1(x_{25})$ and $u_1(x_1), u_1(x_2), \ldots, u_1(x_{25})$ respectively. The square of the scalar product of vectors $f_1$ and $u_1$ can be obtained as follows.

$$(f_1, u_1)^2 = \left\{ \sum_{i=1}^{25} f_1(x_i) u_1(x_i) \right\}^2 \quad (7)$$

The square of the norms (magnitudes) of the vectors $f_1$ and $u_1$ are obtained as follows:

$$\|f_1\| = \sum_{i=1}^{25} f_1^2(x_i) \quad (8)$$

$$\|u_1\| = \sum_{i=1}^{25} u_1^2(x_i) \quad (9)$$

Substituting the equations (7), (8) and (9) into the equation (3), the similarity $S_{11}$ can be obtained. The similarity $S_{11}$ is stored in a second buffer memory 17 of FIG. 5 as shown in FIG. 9.

Referring back to FIG. 7, the signals representing the second sub-area pattern $f_2$ with $5 \times 5$ cells are read out by the read out circuit 14-1 and supplied to the calculating circuit 15 of FIG. 5. The second sub-area pattern $f_2$ is at the top of the figure but shifted to the right of $f_1$ by one cell length. Then, the calculating circuit 15 calculates the similarity $S_{21}$ between the second sub-area pattern $f_2$ and the first partial characteristic pattern $u_1$ in the same way as $S_{11}$. The result $S_{21}$ is stored in the memory 17 in the same column as $S_{11}$ as shown in FIG. 9. The third sub-area pattern $f_3$ is read out from the next region on the memory plane, shifted to the right by one cell from the second sub-area. The pattern $f_3$ is supplied to calculating circuit 15 and the similarity $S_{31}$ between the pattern $f_3$ and the first partial characteristic pattern $u_1$ is calculated. The similarity $S_{31}$ is stored the third position in the same column as $S_{11}$ and $S_{21}$ as shown in FIG. 9.

After the calculation of the similarity $S_{19\text{-}1}$ between the 19th sub-area pattern $f_{19}$ at the uppermost and rightmost part of the memory plane, the 20th sub-area pattern $f_{20}$ is read out from the region shown at leftmost and shifted down by one cell length from $f_1$. The signal of pattern $f_{20}$ is supplied to calculating circuit 15 together with partial characteristic pattern signal $u_1$ and the similarity $S_{20\text{-}1}$ is obtained.

Similar processes are repeatedly performed for the sub-area patterns $f_{21}, \ldots, f_{38}, \ldots, f_{514}, \ldots, f_{532}$ which are overlappingly shifted by one cell length along the row or column from the preceeding sub-area. All the similarities thus obtained with reference to the first partial characteristic pattern $u_1$ are stored in the same column, i.e., the first column of the second buffer memory 17 as shown in FIG. 9.

The second partial characteristic pattern $u_2$ is read out from the first dictionary memory 16 of FIG. 5 and is supplied to the first similarity calculating circuit 15. The sub-area patterns $f_1$–$f_{532}$ of the input pattern f are repeatedly read out from the first buffer memory 14 and supplied to the calculating circuit 15. The similarities between each sub-area pattern and the second partial characteristic pattern, $S_{12}, S_{22}, S_{32}, \ldots, S_{532\text{-}2}$, thus obtained are stored in the second column of the second buffer memory 17 as shown in FIG. 9. In this way, all the similarities between each of the sub-area patterns and each of the partial characteristic patterns are calculated in the circuit 15 and then stored in the second buffer memory 17 as shown in FIG. 9. It is clear from FIG. 9 that the similarities are stored in the memory 17 in a matrix form as shown by Table 1 or equation (4).

In a second dictionary memory 18 of FIG. 5, a plurality of reference similarity matrices $\Phi^l$ are stored. The number of matrices is equal to the number of categories of patterns to be handled. In case of alphabetical characters, for example, the number of categories L is equal to 26. The reference similarity matrices $\Phi^l$ are produced in the same way as that of the input pattern similarity matrices mentioned above. In other words, if the input pattern f is replaced by every reference pattern $f_o$ representing one of the alphabetical characters A-Z, for example, the reference similarity matrices $\Phi^l$ (l=1, 2, .., 26) can be automatically obtained as the output of the first similarity calculating circuit 15.

Each reference similarity matrix $\Phi^l$ is read out by its read out circuit 18-1 from the second dictionary memory 18 and supplied to a second similarity calculating circuit 19 one by one. At the same time the input pattern similarity matrix F is read out by a readout circuit 17-1 and supplied to the second similarity calculating circuit 19. The circuit 19 calculates the similarities between the matrix F and each of the matrices $\Phi^l$ in accordance with the equation (6). The twenty-six similarities thus obtained are supplied to a comparator 21. The comparator 21 detects the maximum value of similarity by comparing the similarities calculated by circuit 19 with each other. The comparator 21 gives the category number l, having the maximum value of similarity at its output terminal.

Figure 10:
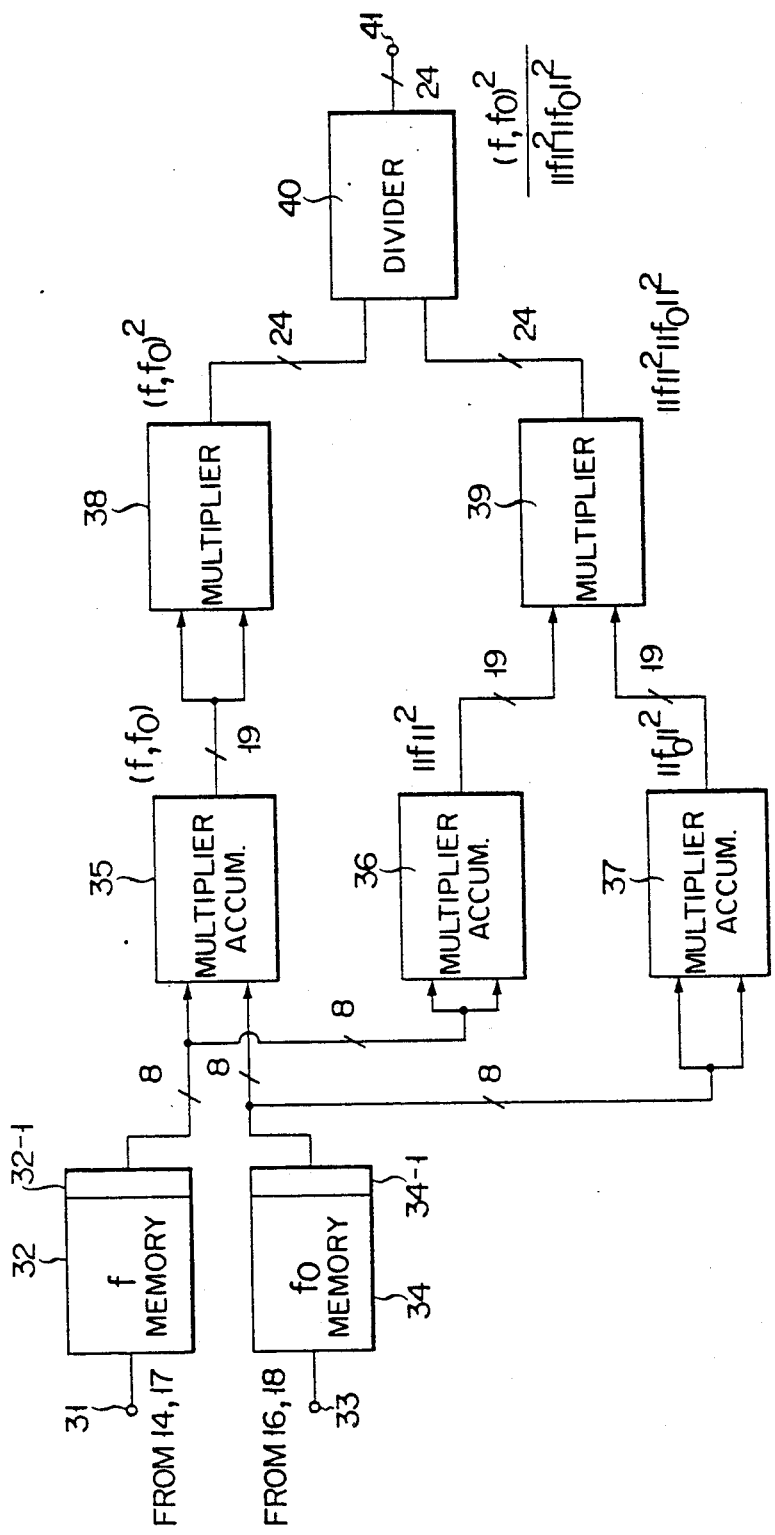
FIG. 10 is a block diagram showing an example of an embodiment of the first and second similarity calculators of FIG. 5.

In FIG. 10, a more specific embodiment of the first and the second similarity calculating circuits are shown. As already explained, the first and second similarity calculating circuits carry out similar calculations. For simplification, the similarity calculating circuit of FIG. 10 is explained for the case where two different vectors f and $f_o$ are, respectively, the unknown and the reference pattern. Thus the pattern f stored through an input terminal 31 in a third buffer memory 32 can be either the sub-area pattern $f_i$ from the readout circuit 14-1 or the input pattern similarity matrix F from the readout circuit 17-1. The pattern $f_o$ stored through another input terminal 33 in a fourth buffer memory 34 can be either the partial characteristic pattern $u_i$ or the reference similarity matrix $\Phi^l$. The contents of the memories 32 and 34 are read out by their read out circuits 32-1 and 34-1 in such a manner that corresponding elements $f(x_i)$ and $f_o(x_i)$ of the vectors f and $f_o$ are read out successively. The signals which represent the corresponding elements of the vector f or $f_o$ are then supplied via 8 parallel signal lines to a multiplier accumulator circuit 35. Circuit 35 has two input terminals and one output terminal. The signals from buffer memories 32 and 33 are given through the respective input terminals to circuit 35. Similar multiplier accumulator circuits 36 and 37 are provided to receive the read out signals successively from buffer memories 32 and 34 respectively. The readout signals $f(x_i)$ from buffer memory 32 are supplied to both input terminals of circuit 36 at the same time. The read out signals $f_o(x_i)$ from buffer memory 34 are also supplied to both input terminals of circuit 37 at the same time. The multiplier accumulator circuits 35, 36 and 37 carry out the multiplication and accumulation of their two input signals which are supplied successively. More specifically, circuit 35 conducts the computation $$\sum_{i=1}^{n} f(x_i) f_o(x_i),$$

circuit 36 conducts the computation $$\sum_{i=1}^{n} \{f(x_i)\}^2,$$

and circuit 37 conducts the computation $$\sum_{i=1}^{n} \{f_o(x_i)\}^2.$$

Thus circuit 35 gives the scalar product $(f, f_o)$ at its output terminal. Circuits 36 and 37 give the squared norms $\|f\|^2$ and $\|f_o\|^2$ as their outputs respectively. The output signals of circuit 35 are supplied via parallel lines to both input terminals of a first multiplier circuit 38. A second multiplier circuit 39 is provided to receive signals from circuits 36 and 37 at its two input terminals. The signal lines connecting them are also parallel lines. Multipliers 38 and 39 conduct multiplication of the signals received at their terminals. Multiplier 38 gives at its output terminal the result $(f, f_o)^2$ because its both input signals are $(f, f_o)$. Multiplier 39 gives at its output terminal the result $\|f\|^2 \|f_o\|^2$. These output signals are supplied via two sets of 24 parallel lines to the two input terminals of a divider 40. The divider conducts the computation: $(f, f_o)^2 / \|f\|^2 \|f_o\|^2$ and gives the result via 24 lines to an output terminal 41. This output signal is supplied to either the second buffer memory 17 or the comparator 20 of FIG. 5.

Figure 11:
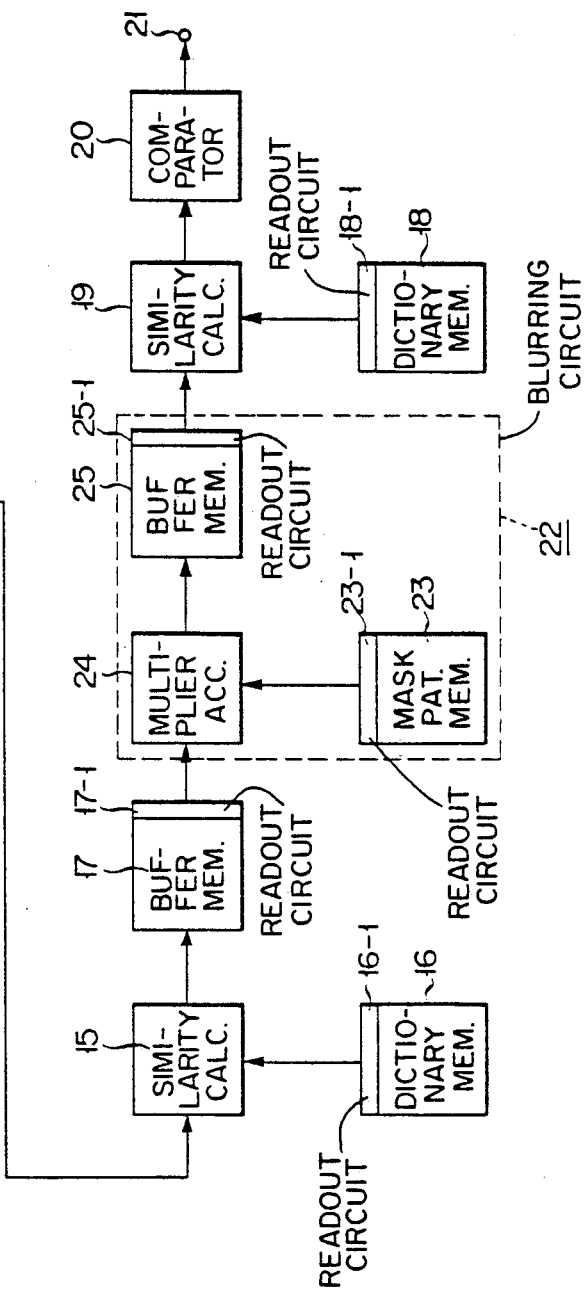
FIG. 11 is a block diagram showing another embodiment of this invention.

FIG. 11 shows another embodiment of the invention in which a blurring circuit 22 is added to the apparatus shown in FIG. 5. Since the other parts of FIG. 11 are the same as those of FIG. 5, numbers correspond to those of FIG. 5 and further explanation is limited to blurring circuit 22. Readout circuit 17-1 reads out every 5×5 set of matrix elements and supplies signals to the fourth multiplier accumulator circuit 24. Every 5×5 set of matrix elements is read out in the manner shown in FIG. 12. FIG. 12 shows the virtual memory plane with a 19×28 matrix of similarities corresponding to those stored in each column. Every 5×5 set of matrix elements is selected within a frame of 5×5 elements which is shifted at intervals of 3 elements from the uppermost and the leftmost part to the right and downwards on the virtual memory plane.

A mask pattern memory 23 is provided for storing a mask pattern having weighting coefficients shown in FIG. 13(A). The weighting coefficients are distributed over the 5×5 matrix region to form a well known Gaussian distribution as shown FIG. 13(B). The mask pattern signals are read out by read out circuit 23-1 and supplied to the fourth multiplier accumulator circuit 24 through another input terminal. If we express the number of 5×5 sets of elements read out from buffer memory 17 as vectors $F_1, F_2, \ldots, F_{70}$ each having 5×5 elements, and the mask pattern as vector G, the circuit 24 conducts the following computations.

$$\left.\begin{array}{l}(G, F_1) = \sum_{i=1}^{25} G(X_i) F_1(X_i) = S_{1-1'} \\ (G, F_2) = \sum_{i=1}^{25} G(X_i) F_2(X_i) = S_{2-1'} \\ \vdots \\ (G, F_{70}) = \sum_{i=1}^{25} G(X_i) F_{70}(X_i) = S_{70-1'}\end{array}\right\} \quad (10)$$

where $G(X_i)$ is the value of a coefficient at the position $X_i$ and $F_1(X_i)$ are similarities at the coresponding position $X_i$. The results $S_{1-1'}, S_{2-2'}, \ldots, S_{70-1'}$ thus obtained are stored in the third buffer memory 25 of FIG. 11 in the same way as they are stored in the first column of the virtual memory plane shown in FIG. 14. It is clear from equation (10) that the blurring operation is the same operation as calculating the scalar product between the vectors G and $F_i$ ($i=1, 2, \ldots, 70$).

The second column of similarities $S_{1-2}, S_{2-2}, \ldots, S_{70-2}$ are blurred in the same manner as mentioned above and the blurred similarities $S_{1-2'}, S_{2-2'}, \ldots, S_{70-2'}$ are stored in the second column of the memory 25 shown in FIGS. 11 and 14. The input pattern similarity matrix F shown in FIG. 9 is converted into a 20×70 element blurred input matrix F' shown in FIG. 14 by conducting the blurring operation for all similarities shown in FIG. 9.

Similar blurring is given to the reference similarity matrices and the blurred reference matrices $\Phi'^l$ are stored in the second dictionary memory 18 shown in FIG. 11. Each of blurred reference matrices $\Phi'^l$ is read out by its readout circuit 18-1 and supplied to the second similarity calculating circuit 19 via one of the input terminals. The blurred input matrix F' is read out from the third buffer memory 25 by its readout circuit 25-1 and supplied to the other input terminal of similarity calculating circuit 19. The circuit 19 calculates the similarities between the blurred input matrix F' of the input pattern and each of the blurred reference matrices $\Phi'^l$ of the reference patterns.

According to the invention mentioned above it is possible to accurately recognize the difference between such similar letters as "O" and "Q" or "7" and "9." The reason is that these characters are similar but their partial characteristic patterns are different from each other.

It should be noted that there may be various modifications to the present invention. For example, various calculations carried out by special circuits can be replaced by a computer with appropriate software. The method or apparatus according to the present invention can recognize various kinds of characters other than the alphabet. For example, more complicated characters such as Chinese or Japanese characters can be recognized. Furthermore, in addition to characters, various kinds of patterns such as human voice patterns can be recognized by the apparatus according to this invention.

An example of the application of the invention to the recognition of a sound pattern is briefly explained in conjunction with FIGS. 15–18. Referring to FIG. 15, human voices are picked up by a microphone 51 and converted into electrical signals. The signals are amplified by amplifier 52 and divided into a plurality of different frequency bands (e.g., 16 channels) by band pass filters 53 (53-1, 53-2, . . . , 53-16) having different central frequencies from each other. The output signals of these filters 53 are then supplied to the detectors 54 (54-1, 54-2, . . . , 54-16) to detect their envelopes. The detected envelopes of signals are supplied to the A/D converters 55 (55-1, 55-2, . . . , 55-16) in which they are sampled at intervals of 1 millisecond and are converted into digital signals representing the instantaneous amplitudes of each signal. FIG. 16 is a schematic view showing the signals representing a human sound "BA," example, in the three dimensional graph having x, y and z axes. The x axis shows the time intervals and the y axis shows the frequency or the channel number of the band pass filters 53. The z axis shows the instantaneous amplitudes of the signals passing through the filters 53, detectors 54 and A/D converters 55. It can be clearly seen from FIG. 16 that the sound can be expressed by a visual pattern and that this pattern can be represented by a vector f having n dimensions.

The output signals of A/D converters 55 are supplied to averaging circuits 56 (56-1, 56-2, . . . , 56-16) where the average amplitude of each signal for every 10 millisecond time period is given at their output terminals 57 (57-1, 57-2, . . . , 57-16).

Figures 17, 18:
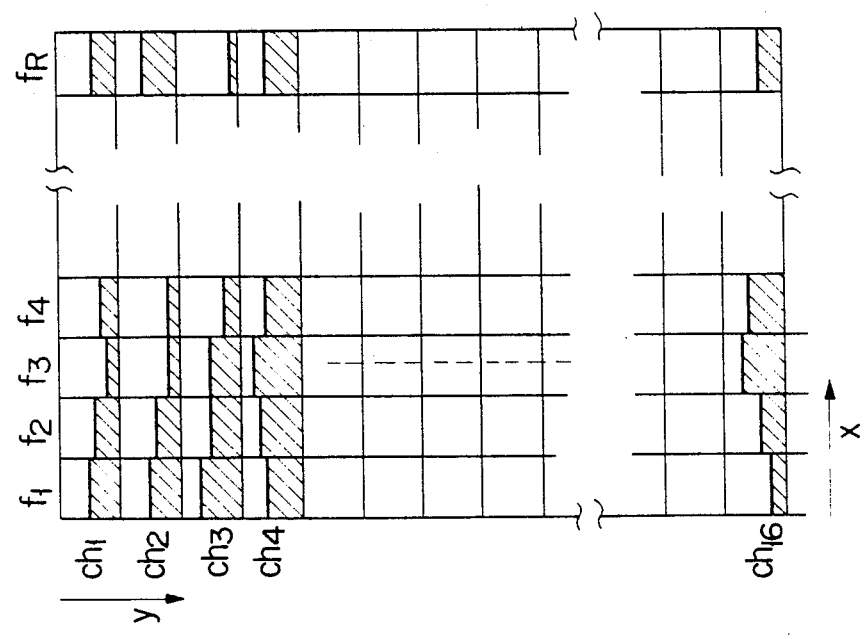

FIG. 17 schematically shows the voice pattern of a certain word thus obtained at the output terminals 57. The pattern comprises 16×R picture elements for example. Each element has a darkness representing the average amplitude. In FIG. 17, however, the levels are shown by hatching for explanatory purposes. The voice pattern of FIG. 7 is divided into R sub-areas $f_1, f_2, \ldots, f_R$ each of which includes 16 channels of different signals having 10 m seconds of time intervals. FIG. 18 shows examples of partial characteristic patterns $u_1, u_2, \ldots, u_K$ provided for calculation of similarities the sub-area patterns of FIG. 17. It is preferred that these partial characteristic patterns $u_1, u_2, \ldots, u_K$ be extracted from different phonemes including the vowels a, e, i, o, and u, and such consonants as p, k, t, etc. From the output terminals 57 of averaging circuits 56, the digital signals representing the sound amplitudes of each sub-area of the time-frequency plane go to the first buffer memory 14, shown in FIG. 5. There, they are treated exactly like the digital signals representing a visual pattern, whose processing was described above. They are output in sequence by read-out circuit 14-1 to first similarity calculating circuit 15, where they are used (along with the partial characteristic patterns stored in first dictionary memory 16) to calculate an input pattern similarity matrix. In this way the input patter similarity matrix F of the input sound pattern representing a word is obtained. The reference similarity matrices $\Phi^l$ for the reference sound patterns of L words are obtained in a similar manner. In this way the input unknown sounds are recognized in the same manner as the recognition of the characteristic patterns mentioned above. It would also be possible, in another embodiment, to produce a visual pattern (such as that shown in FIG. 18) for an unknown sound pattern and then to process the visual pattern in the normal manner (i.e., beginning with optical scanning). In such a case, a conventional printer (not shown) would be connected to output terminals 57 in FIG. 17 to produce the visual pattern from the digital signals representing sounds.

It should be noted that blurring can be given for similarities in the rows of FIG. 9 instead of those in the columns as explained above.

Although illustrative embodiments of the invention have been described in detail with reference to the accompanying drawings, it is to be understood that the invention is not limited to those precise embodiments and that various changes and modifications may be effected therein by one skilled in the art without departing from the scope or spirit of the invention.

I claim:

1. A pattern recognition apparatus for identifying an unknown input pattern as the one of a number of reference patterns to which the input pattern is most similar, the input pattern and reference patterns each being composed of a plurality of sub-area patterns, said apparatus comprising:
    input means for converting the input pattern into digital electrical signals;
    first dictionary memory means for storing a plurality of partial characteristic patterns;
    first similarity calculating means connected to said input means and said first dictionary memory means for calculating an input pattern similarity matrix between the sub-area patterns of the input pattern and the partial characteristic patterns;
    second dictionary memory means for storing a number of reference similarity matrices corresponding to the number of reference patterns, each of the reference similarity matrices being calculated between the sub-area patterns of one of the reference patterns and the partial characteristic patterns;
    second similarity calculating means connected to said first similarity calculating means and said second dictionary memory means for calculating similarities between the input pattern similarity matrix and each of the reference similarity matrices; and
    comparison means connected to said second similarity calculating means for identifying one reference pattern by comparing the similarities calculated by said second similarity calculating means.

2. A pattern recognition apparatus as claimed in claim 1 wherein the input pattern, reference patterns, and partial characteristic patterns are visual patterns composed of picture elements in a plane.

3. A pattern recognition apparatus as claimed in claim 2 wherein the digital electrical signals represent the darkness of each of the picture elements.

4. A pattern recognition apparatus as claimed in claim 3 wherein said input means comprises converting means for optically scanning and converting the input pattern into the digital electrical signals.

5. A pattern recognition apparatus as claimed in claim 4 wherein said converting means comprises a raster scanning means for scanning the input pattern and an analog-to-digital converter to convert the input pattern into the digital electrical signals.

6. A pattern recognition apparatus as claimed in claim 1 wherein the input pattern, reference patterns, and partial characteristic patterns are sound patterns composed of areas on a time-frequency plane.

7. A pattern recognition aparatus as claimed in claim 1, 2, 4 or 6 further comprising:
    first buffer memory means connected between said input means and said first similarity calculating means for storing the sub-area patterns of the input pattern; and second buffer memory means connected between said first similarity calculating means and said second similarity calculating means for storing the input pattern similarity matrix.

8. A pattern recognition apparatus as claimed in claim 6 wherein the digital electrical signals represent the sound amplitude of each of the areas.

9. A pattern recognition apparatus as claimed in claim 8 wherein said input means comprises:
   transducer means for converting the sound patterns into analog electrical signals;
   frequency division means connected to said transducer means for separating the analog electrical signals into a plurality of frequency bands; and
   digitizing means connected to said frequency division means for separating the analog electrical signals into a plurality of time segments and producing a digital electrical signal corresponding to the sound amplitude in each time segment in each frequency band.

10. A pattern recognition apparatus as claimed in claim 9 wherein
   said transducer means comprises a microphone connected to an amplifier;
   said frequency division means comprises a plurality of band pass filters connected in parallel to the output of said amplifier, said plurality of band pass filters corresponding to the plurality of frequency bands; and
   said digitizing means comprises for each of said band pass filters:
   a. a detector connected to said band pass filter to detect the envelope of the analog signal; and
   b. an analog-to-digital converter connected to said detector to produce a digital electrical signal corresponding to the amplitude of the envelope at predetermined intervals.

11. A pattern recognition apparatus as claimed in claim 6 or 8 wherein the partial characteristic patterns comprise phonemes.

12. A pattern recognition apparatus as claimed in claim 2 wherein the partial characteristic patterns comprise at least one end point, at least one intersection point, and at least one loop.

13. A pattern recognition apparatus as claimed in claim 12 wherein the sub-area patterns overlap.

14. A pattern recognition apparatus as claimed in claim 1 further comprising blurring means connected between said first similarity calculating means and said second similarity calculating means for calculating a blurred input matrix from the input pattern similarity matrix,
   said second similarity calculating means calculating similarities between the blurred input matrix and each of the reference similarity matrices.

15. A pattern recognition apparatus as claimed in claim 14 wherein said blurring means comprises:
   a mask pattern memory to store a mask pattern having weighting coefficients; and
   a multiplier accumulator circuit connected to said mask pattern memory and said first similarity calculating means to calculate the blurred input matrix.

16. A pattern recognition apparatus as claimed in claim 15 wherein the weighting coefficients are distributed in a Gaussian distribution.

17. A pattern recognition apparatus as claimed in claim 1 wherein said comparison means identifies the one reference pattern corresponding to the largest value of the similarities calculated by said second similarity calculating means.

18. A pattern recognition apparatus as claimed in claim 1 wherein said first and second similarity calculating means calculate the similarity S between any two vectors f and $f_o$ in accordance with the formula:

$$S = \frac{(f, f_o)^2}{\|f\|^2 \|f_o\|^2}$$

19. A pattern recognition apparatus as claimed in claim 18 wherein said first similarity calculating means calculates the input pattern similarity matrix by calculating similarities S between vectors f representing the sub-area patterns of the input pattern and vectors u representing the partial characteristic patterns, in accordance with the formula:

$$S = \frac{(f, u)^2}{\|f\|^2 \|u\|^2}$$

20. A pattern recognition apparatus as claimed in claim 18 or 19 wherein said second similarity calculating means calculates the similarities S between a vector representing the input pattern similarity matrix F and vectors representing the reference similarity matrices in accordance with the formula:

$$S = \frac{(F, \Phi^j)^2}{\|F\|^2 \|\Phi^j\|^2}$$

21. A pattern recognition apparatus as claimed in claim 1 wherein said first and second similarity calculating means are similarity calculating circuits for calculating the similarity between a first vector and a second vector, each of said similarity calculating circuits comprising:
   a first buffer memory to store the first vector;
   a second buffer memory to store the second vector;
   a first multiplier accumulator connected to said first buffer memory and said second buffer memory to calculate the scalar product of the two vectors;
   a second multiplier accumulator connected to said first buffer memory to calculate the square of the norm of the first vector;
   a third multiplier accumulator connected to said second buffer memory to calculate the square of the norm of the second vector;
   a first multiplier connected to said first multiplier accumulator to calculate the square of the scalar product of the two vectors;
   a second multiplier connected to said second multiplier accumulator and said third multiplier accumulator to calculate the product of the squares of the norms of the first and second vectors; and
   a divider connected to said first multiplier and said second multiplier to calculate the quotient of the square of the scalar product of the two vectors and the product of the squares of the norms of the two vectors.

22. A pattern recognition apparatus as claimed in claim 21 wherein said first multiplier accumulator calculates the scalar product $(f, f_o)$ of the two vectors f and $f_o$ according to the formula:

$$(f, f_o) = \sum_{i=1}^{n} f(x_i)f_o(x_i)$$

23. A pattern recognition apparatus as claimed in claim 21 or 22 wherein said second and third multiplier accumulators calculate the squares $\|f\|^2$ of the norms of vectors f in accordance with the formula $$\|f\|^2 = \sum_{i=1}^{n} f^2(x_i)$$

* * * * *